(12) United States Patent
Ross et al.

(10) Patent No.: US 8,499,656 B2
(45) Date of Patent: Aug. 6, 2013

(54) EIGHT SPEED DUAL CLUTCH TRANSMISSION

(75) Inventors: Craig S. Ross, Ypsilanti, MI (US);
Edward W. Mellet, Rochester Hills, MI (US); Scott H. Wittkopp, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 333 days.

(21) Appl. No.: 12/987,819

(22) Filed: Jan. 10, 2011

(65) Prior Publication Data
US 2012/0174707 A1   Jul. 12, 2012

(51) Int. Cl.
*F16H 3/093*   (2006.01)

(52) U.S. Cl.
USPC ............... 74/330; 74/331; 74/333; 74/340

(58) Field of Classification Search
USPC ................... 74/330, 331, 334, 340
See application file for complete search history.

(56) References Cited

U.S. PATENT DOCUMENTS

| | | | |
|---|---|---|---|
| 3,589,483 A * | 6/1971 | Smith | ........................ 192/3.52 |
| 5,429,005 A | 7/1995 | Fukui et al. | |
| 7,140,267 B2 | 11/2006 | Haka | |
| 7,231,843 B2 | 6/2007 | Gumpoltsberger et al. | |
| 7,353,724 B2 | 4/2008 | Chen | |
| 7,669,497 B2 * | 3/2010 | Borgerson et al. | ............. 74/340 |
| 7,896,770 B2 * | 3/2011 | Earhart et al. | ............... 475/218 |
| 8,038,564 B2 * | 10/2011 | Earhart et al. | ............... 475/218 |
| 8,151,662 B2 * | 4/2012 | Fitzgerald et al. | ............. 74/330 |
| 8,342,048 B2 * | 1/2013 | Rieger | ......................... 74/330 |
| 8,365,625 B2 * | 2/2013 | Rieger et al. | .................... 74/330 |
| 8,365,626 B2 * | 2/2013 | Rieger et al. | .................... 74/330 |
| 8,393,239 B2 * | 3/2013 | Rieger et al. | .................... 74/330 |
| 2005/0087030 A1 | 4/2005 | Haka | |
| 2005/0247147 A1 | 11/2005 | Gumpoltsberger et al. | |
| 2005/0252325 A1 * | 11/2005 | Stevenson | ...................... 74/325 |
| 2007/0113693 A1 | 5/2007 | Chen | |
| 2007/0199393 A1 | 8/2007 | Hattori | |
| 2009/0036247 A1 * | 2/2009 | Earhart et al. | .................. 475/35 |
| 2011/0118074 A1 * | 5/2011 | Earhart et al. | ............... 475/218 |

FOREIGN PATENT DOCUMENTS

EP   1624232 A1   2/2006

* cited by examiner

*Primary Examiner* — Troy Chambers
*Assistant Examiner* — Valentin Craciun

(57) ABSTRACT

A transmission is connectable to an input member and includes an output transfer gear, first and second shaft members, first and second countershaft members, a plurality of co-planar gear sets, and a plurality of torque transmitting devices. The torque transmitting devices include a plurality of gears, synchronizer assemblies and a dual clutch assembly. The transmission is operable to provide at least one reverse speed ratio and a plurality of forward speed ratios between the input member and the output member.

20 Claims, 2 Drawing Sheets

EIGHT SPEED DUAL CLUTCH TRANSMISSION

TECHNICAL FIELD

The present disclosure relates to transmissions and more particularly to a compact, dual clutch multiple speed transmission having at least two countershafts to establish eight or more gear speeds.

BACKGROUND

The statements in this section merely provide background information related to the present disclosure and may or may not constitute prior art.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a transmission having first and second transmission input shafts, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between an input member and an output member.

In another aspect of the present invention, the transmission includes a transmission housing.

In yet another aspect of the present invention, the transmission includes a dual clutch assembly having a first clutch, second clutch and a clutch housing connectable to an engine output member. The clutch housing is rotationally supported within the transmission housing.

In yet another aspect of the present invention, the transmission includes a first, second, third, fourth, fifth and sixth gear set. The first gear set includes a first gear, a second gear and a third gear. The first gear is in mesh with the third gear and the second gear is in mesh with the third gear. The second gear set includes a first gear in mesh with a second gear and a third gear. The third gear set includes a first gear in mesh with a second gear and a third gear. The fourth gear set includes a first gear in mesh with a second gear. The fifth gear set includes a first gear in mesh with a second gear and the sixth gear set includes a first gear in mesh with a second gear and a third gear.

In yet another aspect of the present invention, the transmission includes a first transmission input member rotatably supported in the transmission housing. Each of the first gears of the fourth, fifth and sixth gear sets are rotatably fixed for common rotation with the first transmission input member. The selective engagement of the first clutch of the dual clutch assembly transfers torque from the clutch housing to the first transmission input member.

In yet another aspect of the present invention, the transmission includes a second transmission input member rotatably supported in the transmission housing. Each of first gears of the first, second and third gear set are rotatably fixed for common rotation with the second transmission input member. The second transmission input member is concentric with the first transmission input member and at least partially surrounds the first transmission input member. The selective engagement of the second clutch of the dual clutch assembly transfers torque form the clutch housing to the second transmission input member.

In yet another aspect of the present invention, the transmission includes a first countershaft rotatably supported within the transmission housing and spaced apart from and parallel with the first and second transmission input members. The third gear of the first gear set, the third gear of the second gear set, the third gear of the third gear set, the second gear of the fourth gear set, the second gear of the fifth gear set and the third gear of the sixth gear set are each selectively connectable for common rotation with the first countershaft.

In yet another aspect of the present invention, the transmission includes a second countershaft rotatably supported within the transmission housing and spaced apart from and parallel with the first and second transmission input members. The second gear of the first gear set, the second gear of the second gear set, the second gear of the third gear set and the second gear of the sixth gear set are each selectively connectable for common rotation with the second countershaft.

In yet another aspect of the present invention, the transmission includes six synchronizer assemblies for selectively coupling at least one of the gears of the first, second, third, fourth, fifth and sixth gear sets with at least one of the first countershaft and the second countershaft.

In yet another aspect of the present invention, a first synchronizer assembly selectively connects the second gear of the first gear set to the second countershaft.

In still another aspect of the present invention, a second synchronizer assembly selectively connects at least one of the second gear of the second gear set and second gear of the third gear set to the second countershaft.

In still another aspect of the present invention, a third synchronizer assembly selectively connects at least one of the third gear of the second gear set and the third gear of the third gear set to the first countershaft.

In still another aspect of the present invention, a fourth synchronizer assembly selectively connects at least one of the second gear of the fourth gear set and second gear of the fifth gear set to the first countershaft.

In still another aspect of the present invention, a fifth synchronizer assembly selectively connects the second gear of the sixth gear set to the second countershaft.

In still another aspect of the present invention, a sixth synchronizer assembly selectively connects the third gear of the sixth gear set to the first countershaft.

In still another aspect of the present invention, a first countershaft transfer gear fixed to the first countershaft for common rotation with the first countershaft and a second countershaft transfer gear fixed to the second countershaft for common rotation with the second countershaft. The first and second countershaft transfer gears transfer torque from at least one of the first and second countershafts to the transmission output member.

In still another aspect of the present invention, the selective engagement of the first and second clutches of the dual clutch assembly interconnects the dual clutch housing with at least one of the first and the second transmission input members and the selective engagement of at least one of the six synchronizer assemblies establishes at least one of eight forward speed ratios.

The above features and advantages and other features and advantages of the present invention are readily apparent from the following detailed description of the best modes for carrying out the invention when taken in connection with the accompanying drawings wherein like reference numbers refer to the same component, element or feature.

DESCRIPTION

Figure 1:
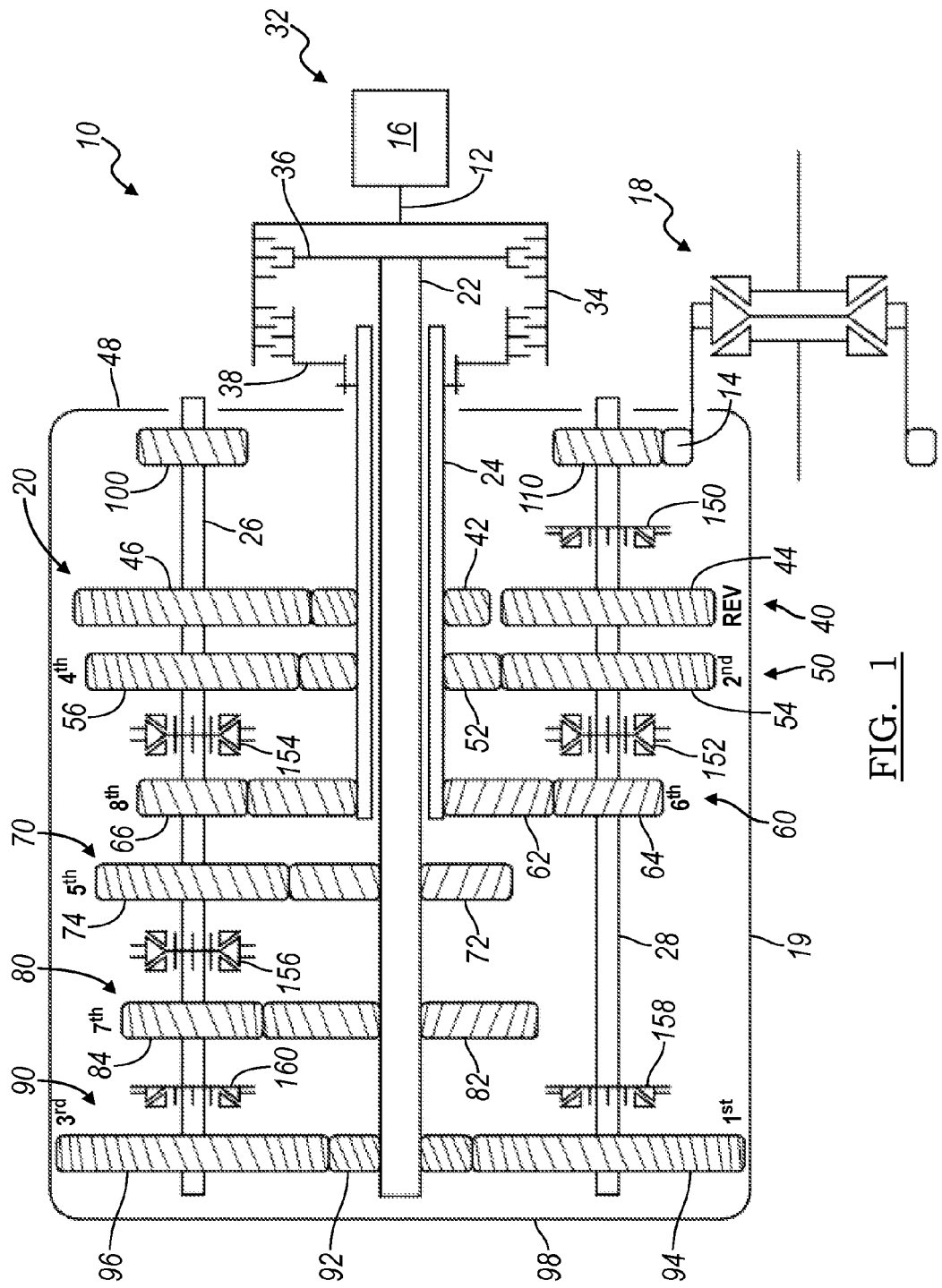
FIG. 1 is a schematic illustration of an embodiment of an eight speed transmission having a dual clutch, two input shafts, a plurality of gear sets and six synchronizers, in accordance with the present invention.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine 16 or other torque producing machine to provide a driving torque to input member 12. The output member or gear 14 rotatably drives a differential assembly 18. The differential assembly 18 transfers torque delivered by output member 14, ultimately, to a pair road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, and a second countershaft 28. The second transmission input shaft or member 24 is a hollow shaft that is concentric with and overlies the first transmission input shaft or member 22. The first countershaft 26 and the second countershaft 28 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that while the dual clutch assembly 32 is shown throughout the Figures as a wet clutch assembly, the dual clutch assembly 32 may be a dry clutch assembly without departing from the scope of the present invention.

The gearing arrangement 20 also includes a plurality of co-planar, meshing gear sets 40, 50, 60, 70, 80 and 90. The present invention contemplates that the plurality of co-planar, meshing gear sets 40, 50, 60, 70, 80 and 90 may be arranged axially along transmission input shafts 22, 24 in an order other than that which is shown in FIG. 1 and still be within the scope of the invention. Co-planar gear set 40 includes a first pinion gear 42, a second pinion gear 44 and a third pinion gear 46. First pinion gear 42 is rotatably fixed and connected for common rotation with the second transmission input shaft member 24. Second pinion gear 44 is selectively connectable for common rotation with the second countershaft member 28 and meshes with first pinion gear 42. Third pinion gear 46 is an idler gear that is rotatable on the first countershaft member 26 and meshes with first pinion gear 42. It should be appreciated that first pinion gear 42 may be a separate gear structure fixed to the second transmission input shaft member 24 or gear teeth/splines formed on an outer surface of the second transmission input shaft member 24 without departing from the scope of the present invention. Gear set 40 is disposed proximate a wall 48 of the transmission housing 19 that is on a front or side of the transmission 10 proximate the dual clutch assembly 32.

Co-planar gear set 50 includes a first pinion gear 52, a second pinion gear 54 and a third pinion gear 56. First pinion gear 52 is rotatably fixed and connected for common rotation with the second transmission input shaft member 24 and meshes with second pinion gear 54 and third pinion gear 56. Second pinion gear 54 is selectively connectable for common rotation with the second countershaft member 28. Third pinion gear 56 is selectively connectable for common rotation with the first countershaft member 26. Gear set 50 is positioned adjacent gear set 40.

Co-planar gear set 60 includes a first pinion gear 62, a second pinion gear 64 and a third pinion gear 66. First pinion gear 62 is rotatably fixed and connected for common rotation with the second transmission input shaft member 24 and meshes with second pinion gear 64 and third pinion gear 66. Second pinion gear 64 is selectively connectable for common rotation with the second countershaft member 28. Third pinion gear 66 is selectively connectable for common rotation with the first countershaft member 26. Gear set 60 is disposed adjacent gear set 50.

Co-planar gear set 70 includes a first pinion gear 72 and a second pinion gear 74. First pinion gear 72 is rotatably fixed and connected for common rotation with the first transmission input shaft member 22 and meshes with second pinion gear 74. Second pinion gear 74 is selectively connectable for common rotation with the first countershaft member 26. Gear set 70 is positioned adjacent gear set 60.

Co-planar gear set 80 includes a first pinion gear 82 and a second pinion gear 84. First pinion gear 82 is rotatably fixed and connected for common rotation with the first transmission input shaft member 22 and meshes with second pinion gear 84. Second pinion gear 84 is selectively connectable for common rotation with the first countershaft member 26. Gear set 80 is positioned adjacent gear set 70.

Co-planar gear set 90 includes a first pinion gear 92, a second pinion gear 94 and a third pinion gear 96. First pinion gear 92 is rotatably fixed and connected for common rotation with the first transmission input shaft member 22 and meshes with second pinion gear 94 and third pinion gear 96. Second pinion gear 94 is selectively connectable for common rotation with the second countershaft member 28. Third pinion gear 96 is selectively connectable for common rotation with the first countershaft member 26. Gear set 90 is positioned between gear set 80 and an end wall 98 of the transmission housing 19.

Further, a first countershaft transfer gear 100 is rotatably fixed and connected for common rotation with the first countershaft member 26. A second countershaft transfer gear 110 is rotatably fixed and connected for common rotation with the second countershaft member 28. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other.

A park gear (not shown) may be provided for placing transmission 10 in a park mode that prevents output member 14 from rotating. The park gear may be rotationally fixed to the first countershaft member 26 or to the second countershaft member 28. However, the axial location of the park gear along the first or second countershaft members 26, 28 may be changed in accordance with available packaging space.

With continued reference to FIG. 1, the transmission 10 further includes a plurality of selectively engageable synchronizer assemblies 150, 152, 154, 156, 158 and 160. Synchronizers 150, 158 and 160 are single sided synchronizers and each generally include a shift fork (not shown) that is bi-directionally translated by an actuator (not shown) into at least one engaged position and a neutral or disengaged position. Synchronizer 150 is selectively actuatable to connect for common rotation gear 44 with the first countershaft member 26. Synchronizer 158 is selectively actuatable to connect for common rotation gear 94 with the second countershaft member 28. Synchronizer 160 is selectively actuatable to connect for common rotation gear 96 with the first countershaft member 26. Synchronizers 152, 154 and 156 are double sided synchronizers and generally include a shift fork (not shown) that is bi-directionally translated by an actuator (not shown) into at least two engaged positions and a neutral or disengaged position. In the present embodiment, synchronizer 152 is selectively actuatable to connect gear 54 for common rotation with the second countershaft member 28 and is selectively actuatable to connect gear 64 for common rotation with the second countershaft member 28. Synchronizer 154 is selectively actuatable to connect for common rotation gear 56 with the first countershaft member 26 and is selectively actuatable to connect for common rotation gear 66 with the first countershaft member 26. Synchronizer 156 is selectively actuatable to connect for common rotation gear 74 with the first countershaft 26 and is selectively actuatable to connect for common rotation gear 84 with the first countershaft member 26.

The transmission 10 is capable of transmitting torque from the input shaft 12 to the output gear member 14 in at least eight forward torque ratios and at least one reverse torque ratio. Each of the forward torque ratios and the reverse torque ratio is attained by selective engagement of the dual clutch assembly 32 and one or more of the synchronizer assemblies 150, 152, 154, 156, 158 and 160. Those skilled in the art will readily understand that a different speed ratio is associated with each torque ratio.

It should be appreciated that each individual gear set 40, 50, 60, 70, 80 and 90 provides one or more forward and/or reverse gear ratios upon selective engagement of the synchronizer assemblies 150, 152, 154, 156, 158 and 160. It should also be appreciated that a particular forward or reverse speed ratio may be achieved by different combinations of synchronizer and associated gear sets without departing from the scope of the present invention.

For example, to establish the reverse torque ratio, clutch element 38 is engaged and synchronizer 150 is activated. Clutch element 38 couples the input member 12 with the second transmission input shaft member 24. Synchronizer 150 connects gear 44 to the second countershaft member 28. More specifically, input torque from the input shaft 12 is transferred through the dual clutch assembly 32 to the second transmission input shaft member 24, through pinion gear 42 to gear 46, through gear 46 to gear 44, from gear 44 to the second countershaft member 28 through synchronizer 150, then to second countershaft transfer gear 110 and from second countershaft transfer gear 110 to the output member 14.

To establish a first forward torque ratio (i.e. a 1st gear), clutch element 36 is engaged and synchronizer 158 is activated. Clutch element 36 couples the input member 12 with the first transmission input shaft member 22. Synchronizer 158 couples gear 94 to the second countershaft member 28. Input torque from the input member 12 is transferred through the dual clutch assembly 32 to the first transmission input shaft member 22 to pinion 92. Pinion 92 transfers torque to gear 94 which transfers the torque to the second countershaft member 28 through synchronizer 158 and from the second countershaft member 28 to second countershaft transfer gear 110 and then from second countershaft transfer gear 110 to the output member 14.

To establish a second forward torque ratio (i.e. a 2nd gear), clutch element 38 is engaged and synchronizer 152 is activated. Clutch element 38 couples the input member 12 to the second transmission input shaft member 24 which rotates pinion 52. Synchronizer 152 couples gear 54 to the second countershaft member 28. Accordingly, input torque from the input member 12 is transferred through the dual clutch assembly 32 to the second transmission input shaft member 24, through pinion 52 to gear 54, from gear 54 to synchronizer 152, from synchronizer 152 to the second countershaft member 28 and from the second countershaft member 28 to the second countershaft transfer gear 110 and the output member 14.

To establish a third forward torque ratio (i.e. a 3rd gear), clutch element 36 is engaged and synchronizer 160 is activated. Clutch element 36 couples the input member 12 to the first transmission input shaft member 22 which rotates pinion 92. Synchronizer 160 couples gear 96 to the first countershaft member 26. Thus, input torque from the input member 12 is transferred through the dual clutch assembly 32 to the first transmission input shaft member 22, through pinion 92 to gear 96, through gear 96 to synchronizer 160, from synchronizer 160 to the first countershaft member 26, from the first countershaft member 26 to the first countershaft transfer gear 100 and then from first countershaft transfer gear 100 to the output member 14.

To establish a fourth forward torque ratio (i.e. a 4th gear), clutch element 38 is engaged and synchronizer 154 is activated. Clutch element 38 couples the input member 12 to the second transmission input shaft member 24 which rotates pinion 52. Synchronizer 154 couples gear 56 to the first countershaft member 26. Thus, input torque from the input member 12 is transferred through the dual clutch assembly 32 to the second transmission input shaft member 24 to pinion 52, then from pinion 52 to gear 56, from gear 56 to synchronizer 154, from synchronizer 154 to the first countershaft member 26, from the first countershaft member 26 to first countershaft transfer gear 100 and then from first countershaft transfer gear 100 to the output member 14.

To establish a fifth forward torque ratio (i.e. a 5th gear), clutch element 36 is engaged and synchronizer 156 is activated. Clutch element 36 couples the input member 12 to the first transmission input shaft member 22 which rotates pinion 72. Synchronizer 156 couples gear 74 to the first countershaft member 26. Input torque from the input member 12 is transferred through the dual clutch assembly 32 to the first transmission input shaft member 22, from first transmission input shaft member 22 to pinion 72, from pinion 72 to gear 74, from gear 74 to the first countershaft member 26 through synchronizer 156 to first countershaft transfer gear 100 and from first countershaft transfer gear 100 to the output member 14.

To establish a sixth forward torque ratio (i.e. a 6th gear), clutch element 38 is engaged and synchronizer 152 is activated. Clutch element 38 couples the input member 12 to the second transmission input shaft member 24 which rotates pinion 62. Synchronizer 152 couples gear 64 to the second countershaft member 28. Thus, input torque from the input member 12 is transferred through the dual clutch assembly 32 to the second transmission input shaft member 24 to pinion 62, then from pinion 62 to gear 64, from gear 64 to synchronizer 152, from synchronizer 152 to the second countershaft member 28, from the second countershaft member 28 to second countershaft transfer gear 110 and then from second countershaft transfer gear 110 to the output member 14.

To establish a seventh forward torque ratio (i.e. a 7th gear), clutch element 36 is engaged and synchronizer 156 is activated. Clutch element 36 couples the input member 12 to the first transmission input shaft member 22 which rotates pinion 82. Synchronizer 156 couples gear 84 to the first countershaft member 26. Input torque from the input member 12 is transferred through the dual clutch assembly 32 to the first transmission input shaft member 22, from first transmission input shaft member 22 to pinion 82, from pinion 82 to gear 84, from gear 84 to the first countershaft member 26 through synchronizer 156 to first countershaft transfer gear 100 and from first countershaft transfer gear 100 to the output member 14.

To establish an eighth forward torque ratio (i.e. an 8th gear), clutch element 38 is engaged and synchronizer 154 is activated. Clutch element 38 couples the input member 12 to the second transmission input shaft member 24 which rotates pinion 62. Synchronizer 154 couples gear 66 to the first countershaft member 26. Input torque from the input member 12 is transferred through the dual clutch assembly 32 to the second transmission input shaft member 24, from second transmission input shaft member 24 to pinion 62, from pinion 62 to gear 66, from gear 66 to the first countershaft member 26 through synchronizer 154 to first countershaft transfer gear 100 and from first countershaft transfer gear 100 to the output member 14.

Figure 2:
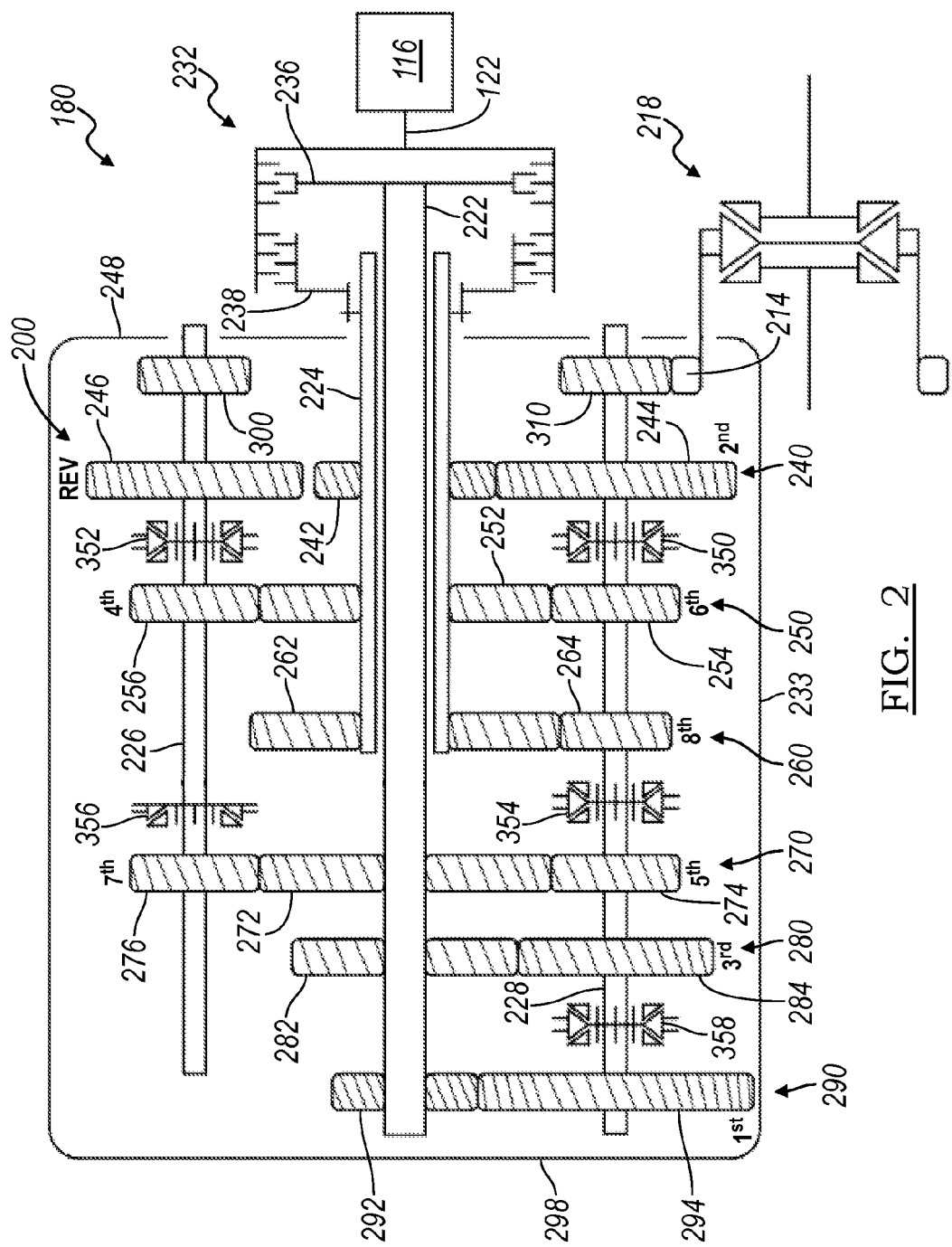
FIG. 2 is a schematic illustration of another embodiment of an eight speed transmission having a dual clutch, two input shafts, a plurality of gear sets and five synchronizers, in accordance with the present invention.

Referring now to FIG. 2, an alternate embodiment of an eight speed dual clutch transmission 180 is illustrated. Transmission 180 includes a gearing arrangement 200 and a dual clutch assembly 232 disposed in a transmission housing 233. Dual clutch 232 is connectable between an input member 122 and a first and second transmission input shaft members 222, 224. The dual clutch assembly 232 includes a clutch housing 234 connectable for common rotation with the input member 122. Further, the dual clutch assembly 232 has first and second clutch elements or hubs 236 and 238. Clutch elements 236 and 238 together with the clutch housing 234 are configured to form a friction clutch, as is known in the art as a dual clutch and described above in the previous embodiment. The clutch element 236 is connected for common rotation with the first transmission input shaft or member 222 and the clutch element 238 is connected for common rotation with the second transmission input shaft or member 224. Thus, selective engagement of clutch element 236 with the clutch housing 234 connects the input member 122 for common rotation with the first transmission input shaft member 222. Selective engagement of clutch element 238 with the clutch housing 234 connects the input member 122 for common rotation with the second transmission input shaft member 224. It should be appreciated that while the dual clutch assembly 232 is shown throughout the Figures as a wet clutch assembly, the dual clutch assembly 232 may be a dry clutch assembly without departing from the scope of the present invention.

The input member 122 is continuously connected with an engine 116 or other torque producing machine to provide a driving torque to input member 122. An output member or gear 214 rotatably drives a differential assembly 218. The differential assembly 218 transfers torque delivered by output member 214, ultimately, to a pair road wheels (not shown).

Gearing arrangement 200 includes a plurality of co-planar, meshing gear sets 240, 250, 260, 270, 280 and 290. The present invention contemplates that the plurality of co-planar, meshing gear sets 240, 250, 260, 270, 280 and 290 may be arranged axially along transmission input shafts 222, 224 in an order other than that which is shown in FIG. 2 and still be within the scope of the invention.

Co-planar gear set 240 includes a first pinion gear 242, a second pinion gear 244 and a third pinion gear 246. First pinion gear 242 is rotatably fixed and connected for common rotation with the second transmission input shaft member 224. Second pinion gear 244 is selectively connectable for common rotation with the second countershaft member 228 and meshes with first pinion gear 242. Third pinion gear 246 is selectively connectable for common rotation the first countershaft member 226 and meshes with the second pinion gear 244. It should be appreciated that first pinion gear 242 may be a separate gear structure fixed to the second transmission input shaft member 224 or gear teeth/splines formed on an outer surface of the second transmission input shaft member 224 without departing from the scope of the present invention. Gear set 240 is disposed proximate a wall 248 of the transmission housing 233 that is on a front or side of the transmission 180 proximate the dual clutch assembly 232.

Co-planar gear set 250 includes a first pinion gear 252, a second pinion gear 254 and a third pinion gear 256. First pinion gear 252 is rotatably fixed and connected for common rotation with the second transmission input shaft member 224 and meshes with second pinion gear 254 and third pinion gear 256. Second pinion gear 254 is selectively connectable for common rotation with the second countershaft member 228. Third pinion gear 256 is selectively connectable for common rotation with the first countershaft member 226. Gear set 250 is positioned adjacent gear set 240.

Co-planar gear set 260 includes a first pinion gear 262 and a second pinion gear 264. First pinion gear 262 is rotatably fixed and connected for common rotation with the second transmission input shaft member 224 and meshes with second pinion gear 264. Second pinion gear 264 is selectively connectable for common rotation with the second countershaft member 228. Gear set 260 is disposed adjacent gear set 250.

Co-planar gear set 270 includes a first pinion gear 272, a second pinion gear 274 and a third pinion gear 276. First pinion gear 272 is rotatably fixed and connected for common rotation with the first transmission input shaft member 222 and meshes with second pinion gear 274 and with the third pinion gear 276. Second pinion gear 274 is selectively connectable for common rotation with the second countershaft member 228. Third pinion gear 276 is selectively connectable for common rotation with the first countershaft member 226. Gear set 270 is positioned adjacent gear set 260.

Co-planar gear set 280 includes a first pinion gear 282 and a second pinion gear 284. First pinion gear 282 is rotatably fixed and connected for common rotation with the first transmission input shaft member 222 and meshes with second pinion gear 284. Second pinion gear 284 is selectively connectable for common rotation with the second countershaft member 228. Gear set 280 is positioned adjacent gear set 270.

Co-planar gear set 290 includes a first pinion gear 292 and a second pinion gear 294. First pinion gear 292 is rotatably fixed and connected for common rotation with the first transmission input shaft member 222 and meshes with second pinion gear 294. Second pinion gear 294 is selectively connectable for common rotation with the second countershaft member 228. Gear set 290 is positioned between gear set 280 and an end wall 298 of the transmission housing 233.

Further, a first countershaft transfer gear 300 is rotatably fixed and connected for common rotation with the first countershaft member 226. A second countershaft transfer gear 310 is rotatably fixed and connected for common rotation with the second countershaft member 228. First countershaft transfer gear 300 is configured to mesh with output member 214 and the second countershaft transfer gear 310 is configured to mesh with output member 214. However, the first countershaft transfer gear 300 and the second countershaft transfer gear 310 do not mesh with each other.

With continued reference to FIG. 2, the transmission 180 further includes a plurality of selectively engageable synchronizer assemblies 350, 352, 354, 356 and 358. Synchronizer 356 is a single sided synchronizer and generally includes a shift fork (not shown) that is bi-directionally translated by an actuator (not shown) into at least one engaged position and a neutral or disengaged position. Synchronizer 356 is selectively actuatable to connect for common rotation gear 276 with the first countershaft member 226. Synchronizers 350, 352, 354 and 358 are double sided synchronizers and each generally include a shift fork (not shown) that is bi-directionally translated by an actuator (not shown) into at least two engaged positions and a neutral or disengaged position. In the present embodiment, synchronizer 350 is selectively actuatable to connect gear 244 for common rotation with the second countershaft member 228 and is selectively actuatable to connect gear 254 for common rotation with the second countershaft member 228. Synchronizer 352 is selectively actuatable to connect for common rotation gear 246 with the first countershaft member 226 and is selectively actuatable to connect for common rotation gear 256 with the first countershaft member 226. Synchronizer 354 is selectively actuatable to connect for common rotation gear 264 with the second countershaft 228 and is selectively actuatable to connect for common rotation gear 274 with the second countershaft member 228. Synchronizer 358 is selectively actuatable to connect for common rotation gear 284 with the second countershaft 228 and is selectively actuatable to connect for common rotation gear 294 with the second countershaft member 228.

The transmission 180 is capable of transmitting torque from the input shaft 122 to the output gear member 214 in at least eight forward torque ratios and at least one reverse torque ratio. Each of the forward torque ratios and the reverse torque ratio is attained by selective engagement of the dual clutch assembly 132 and one or more of the synchronizer assemblies 350, 352, 354, 356 and 358. Those skilled in the art will readily understand that a different speed ratio is associated with each torque ratio.

It should be appreciated that each individual gear set 240, 250, 260, 270, 280 and 290 provides one or more forward and/or reverse gear ratios upon selective engagement of the synchronizer assemblies 350, 352, 354, 356 and 358. It should also be appreciated that a particular forward or reverse speed ratio may be achieved by different combinations of synchronizer and associated gear sets without departing from the scope of the present invention.

For example, to establish the reverse torque ratio, clutch element 238 is engaged and synchronizer 352 is activated. Clutch element 238 couples the input member 122 with the second transmission input shaft member 224. Synchronizer 352 connects gear 246 to the first countershaft member 226. More specifically, input torque from the input shaft 122 is transferred through the dual clutch assembly 232 to the second transmission input shaft member 224, through pinion gear 242 to gear 244 which rotates freely about second countershaft member 228, through gear 244 to gear 246, from gear 246 to the first countershaft member 226 through synchronizer 352, then to first countershaft transfer gear 300 and from first countershaft transfer gear 300 to the output member 214.

To establish a first forward torque ratio (i.e. a 1st gear), clutch element 236 is engaged and synchronizer 358 is activated. Clutch element 236 couples the input member 122 with the first transmission input shaft member 222. Synchronizer 258 couples gear 294 to the second countershaft member 228. Input torque from the input member 112 is transferred through the dual clutch assembly 232 to the first transmission input shaft member 222 to pinion 292. Pinion 292 transfers torque to gear 294 which transfers the torque to the second countershaft member 228 through synchronizer 358 and from the second countershaft member 228 to second countershaft transfer gear 310 and then from second countershaft transfer gear 310 to the output member 214.

To establish a second forward torque ratio (i.e. a 2nd gear), clutch element 238 is engaged and synchronizer 350 is activated. Clutch element 238 couples the input member 122 to the second transmission input shaft member 224 which rotates pinion 242. Synchronizer 350 couples gear 244 to the second countershaft member 228. Accordingly, input torque from the input member 122 is transferred through the dual clutch assembly 232 to the second transmission input shaft member 224, from second transmission input shaft member 224 to pinion 242, from pinion 242 to gear 244, from gear 244 to synchronizer 350, from synchronizer 350 to the second countershaft member 228 and from the second countershaft member 228 to the second countershaft transfer gear 310 and the output member 214.

To establish a third forward torque ratio (i.e. a 3rd gear), clutch element 236 is engaged and synchronizer 358 is activated. Clutch element 236 couples the input member 122 to the first transmission input shaft member 222 which rotates pinion 282. Synchronizer 358 couples gear 284 to the second countershaft member 228. Thus, input torque from the input member 122 is transferred through the dual clutch assembly 232 to the first transmission input shaft member 222, through pinion 282 to gear 284, through gear 284 to synchronizer 358, from synchronizer 358 to the second countershaft member 228, from the second countershaft member 228 to the first countershaft transfer gear 310 and then from second countershaft transfer gear 310 to the output member 214.

To establish a fourth forward torque ratio (i.e. a 4th gear), clutch element 238 is engaged and synchronizer 352 is activated. Clutch element 238 couples the input member 122 to the second transmission input shaft member 224 which rotates pinion 252. Synchronizer 352 couples gear 256 to the first countershaft member 226. Thus, input torque from the input member 122 is transferred through the dual clutch assembly 232 to the second transmission input shaft member 224 to pinion 252, then from pinion 252 to gear 256, from gear 256 to synchronizer 352, from synchronizer 352 to the first countershaft member 226, from the first countershaft member 226 to first countershaft transfer gear 300 and then from first countershaft transfer gear 300 to the output member 214.

To establish a fifth forward torque ratio (i.e. a 5th gear), clutch element 236 is engaged and synchronizer 354 is activated. Clutch element 236 couples the input member 122 to the first transmission input shaft member 222 which rotates pinion 272. Synchronizer 354 couples gear 274 to the second countershaft member 228. Input torque from the input member 122 is transferred through the dual clutch assembly 232 to the first transmission input shaft member 222, from first transmission input shaft member 222 to pinion 272, from pinion 272 to gear 274, from gear 274 to the second countershaft member 228 through synchronizer 354 to second countershaft transfer gear 310 and from second countershaft transfer gear 310 to the output member 214.

To establish a sixth forward torque ratio (i.e. a 6th gear), clutch element 238 is engaged and synchronizer 350 is activated. Clutch element 238 couples the input member 122 to the second transmission input shaft member 224 which rotates pinion 252. Synchronizer 350 couples gear 254 to the second countershaft member 228. Thus, input torque from the input member 122 is transferred through the dual clutch assembly 232 to the second transmission input shaft member 224 to pinion 252, then from pinion 252 to gear 254, from gear 254 to synchronizer 350, from synchronizer 350 to the second countershaft member 228, from the second countershaft member 228 to second countershaft transfer gear 310 and then from second countershaft transfer gear 310 to the output member 214.

To establish a seventh forward torque ratio (i.e. a 7th gear), clutch element 236 is engaged and synchronizer 356 is activated. Clutch element 236 couples the input member 122 to the first transmission input shaft member 222 which rotates pinion 272. Synchronizer 356 couples gear 276 to the first countershaft member 226. Input torque from the input member 122 is transferred through the dual clutch assembly 232 to the first transmission input shaft member 222, from first transmission input shaft member 222 to pinion 272, from pinion 272 to gear 276, from gear 276 to the first countershaft member 226 through synchronizer 356 to first countershaft transfer gear 300 and from first countershaft transfer gear 300 to the output member 214.

To establish an eighth forward torque ratio (i.e. an 8th gear), clutch element 238 is engaged and synchronizer 354 is activated. Clutch element 238 couples the input member 122 to the second transmission input shaft member 224 which rotates pinion 262. Synchronizer 354 couples gear 264 to the second countershaft member 228. Input torque from the input member 122 is transferred through the dual clutch assembly 232 to the second transmission input shaft member 224, from second transmission input shaft member 224 to pinion 262, from pinion 262 to gear 264, from gear 264 to the second countershaft member 228 through synchronizer 354 to first countershaft transfer gear 310 and from first countershaft transfer gear 310 to the output member 214.

Again, it should be appreciated that any one of the gear sets of gear sets 240, 250, 260, 270, 280 and 290 may be changed in size and number gear teeth or gear pitch to produce a certain forward and reverse torque ratio without departing from the scope of the present invention.

The present invention contemplates that a variety of torque ratios and ratio steps are achievable through the selection of tooth counts of the gears of the transmissions described herein. The present invention has many advantages and benefits over the prior art. For example, the present configuration allows for high overall ratio spreads between the first gear ratio and the eighth gear ratio by employing separate pinion gears for a plurality of the gear sets. Thus, a transmission having a more simplified actuation and control system, reduced mass and cost and improved packaging is achieved.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   a transmission housing;
   a dual clutch assembly having a first clutch, second clutch and a clutch housing connectable to an engine output member, wherein the clutch housing is rotationally supported within the transmission housing;
   a first, second, third, fourth, fifth and sixth gear set, wherein the first gear set includes a first gear, a second gear and a third gear, wherein the first gear is in mesh with the third gear and the second gear is in mesh with the third gear, the second gear set includes a first gear in mesh with a second gear and a third gear, the third gear set includes a first gear in mesh with a second gear and a third gear, the fourth gear set includes a first gear in mesh with a second gear, the fifth gear set includes a first gear in mesh with a second gear and the sixth gear set includes a first gear in mesh with a second gear and a third gear;
   a first transmission input member rotatably supported in the transmission housing and wherein each of the first gears of the fourth, fifth and sixth gear sets are rotatably fixed for common rotation with the first transmission input member and wherein the selective engagement of the first clutch of the dual clutch assembly transfers torque from the clutch housing to the first transmission input member;
   a second transmission input member rotatably supported in the transmission housing and wherein each of the first gears of the first, second and third gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;

a first countershaft rotatably supported within the transmission housing and spaced apart from and parallel with the first and second transmission input members, wherein the third gear of the first gear set, the third gear of the second gear set, the third gear of the third gear set, the second gear of the fourth gear set, the second gear of the fifth gear set and the third gear of the sixth gear set are each selectively connectable for common rotation with the first countershaft;

a second countershaft rotatably supported within the transmission housing and spaced apart from and parallel with the first and second transmission input members, wherein the second gear of the first gear set, the second gear of the second gear set, the second gear of the third gear set and the second gear of the sixth gear set are each selectively connectable for common rotation with the second countershaft; and six synchronizer assemblies for selectively coupling at least one of the gears of the first, second, third, fourth, fifth and sixth gear sets with at least one of the first countershaft and the second countershaft, and wherein the selective engagement of the first and second clutches of the dual clutch assembly interconnects the dual clutch housing with at least one of the first and the second transmission input members and the selective engagement of at least one of the six synchronizer assemblies establishes at least one of eight forward speed ratios.

2. The transmission of claim 1 wherein a first of the six synchronizer assemblies selectively connects the second gear of the first gear set to the second countershaft.

3. The transmission of claim 2 wherein a second of the six synchronizer assemblies selectively connects at least one of the second gear of the second gear set and second gear of the third gear set to the second countershaft.

4. The transmission of claim 3 wherein a third of the six synchronizer assemblies selectively connects at least one of the third gear of the second gear set and the third gear of the third gear set to the first countershaft.

5. The transmission of claim 4 wherein a fourth of the six synchronizer assemblies selectively connects at least one of the second gear of the fourth gear set and second gear of the fifth gear set to the first countershaft.

6. The transmission of claim 5 wherein a fifth of the six synchronizer assemblies selectively connects the second gear of the sixth gear set to the second countershaft.

7. The transmission of claim 6 wherein a sixth of the six synchronizer assemblies selectively connects the third gear of the sixth gear set to the first countershaft.

8. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set and the sixth gear set is disposed between the fifth gear set and an end wall of the transmission housing.

9. The transmission of claim 8 wherein the six synchronizer assemblies includes a first synchronizer assembly for selectively connecting the second gear of the first gear set to the second countershaft to establish a reverse gear ratio when the second clutch of the dual clutch is engaged to connect the dual clutch housing to the second transmission input member.

10. The transmission of claim 9 wherein the six synchronizer assemblies includes a second synchronizer assembly for selectively connecting the second gear of the second gear set to the second countershaft to establish a second gear ratio when the second clutch of the dual clutch is engaged to connect the dual clutch housing to the second transmission input member.

11. The transmission of claim 10 wherein the second synchronizer assembly for connects the second gear of the third gear set to the second countershaft to establish an sixth gear ratio when the second clutch of the dual clutch is engaged to connect the dual clutch housing to the second transmission input member.

12. The transmission of claim 11 wherein the six synchronizer assemblies includes a third synchronizer assembly for selectively connecting the third gear of the second gear set to the first countershaft to establish a fourth gear ratio when the second clutch of the dual clutch is engaged to connect the dual clutch housing to the second transmission input member.

13. The transmission of claim 12 wherein the third synchronizer assembly connects the third gear of the third gear set to the first countershaft to establish an eighth gear ratio when the second clutch of the dual clutch is engaged to connect the dual clutch housing to the second transmission input member.

14. The transmission of claim 13 wherein the six synchronizer assemblies includes a fourth synchronizer assembly for selectively connecting the second gear of the fourth gear set to the first countershaft to establish a fifth gear ratio when the first clutch of the dual clutch is engaged to connect the dual clutch housing to the first transmission input member.

15. The transmission of claim 14 wherein the fourth synchronizer assembly connects the second gear of the fifth gear set to the first countershaft to establish a seventh gear ratio when the first clutch of the dual clutch is engaged to connect the dual clutch housing to the first transmission input member.

16. The transmission of claim 15 wherein the six synchronizer assemblies includes a fifth synchronizer assembly for selectively connecting the second gear of the sixth gear set to the second countershaft to establish a first gear ratio when the first clutch of the dual clutch is engaged to connect the dual clutch housing to the first transmission input member.

17. The transmission of claim 16 wherein the six synchronizer assemblies includes a sixth synchronizer assembly for selectively connecting the third gear of the sixth gear set to the first countershaft to establish a third gear ratio when the first clutch of the dual clutch is engaged to connect the dual clutch housing to the first transmission input member.

18. The transmission of claim 1 further comprising a first countershaft transfer gear fixed to the first countershaft for common rotation with the first countershaft and a second countershaft transfer gear fixed to the second countershaft for common rotation with the second countershaft and wherein the first and second countershaft transfer gears transfer torque from at least one of the first and second countershafts to a transmission output member.

19. The transmission of claim 18 wherein the transmission output member is a gear that meshes with the each of the first and second countershaft transfer gears.

20. A transmission comprising:
a transmission housing;
a dual clutch assembly having a first clutch, second clutch and a clutch housing connectable to an engine output member, wherein the clutch housing is rotationally supported within the transmission housing;
a first, second, third, fourth, fifth and sixth gear set, wherein the first gear set includes a first gear, a second gear and a third gear, wherein the first gear is in mesh with the third gear and the second gear is in mesh with the third gear, the second gear set includes a first gear in mesh with a second gear and a third gear, the third gear set includes a first gear in mesh with a second gear and a third gear, the fourth gear set includes a first gear in mesh with a second gear, the fifth gear set includes a first gear in mesh with a second gear and the sixth gear set includes a first gear in mesh with a second gear and a third gear;

a first transmission input member rotatably supported in the transmission housing and wherein each of the first gears of the fourth, fifth and sixth gear sets are rotatably fixed for common rotation with the first transmission input member and wherein the selective engagement of the first clutch of the dual clutch assembly transfers torque from the clutch housing to the first transmission input member;

a second transmission input member rotatably supported in the transmission housing and wherein each of the first gears of the first, second and third gear sets are rotatably fixed for common rotation with the second transmission input member and wherein the second transmission input member is concentric with the first transmission input member and at least partially surrounds the first transmission input member and wherein the selective engagement of the second clutch of the dual clutch assembly transfers torque form the clutch housing to the second transmission input member;

a first countershaft rotatably supported within the transmission housing and spaced apart from and parallel with the first and second transmission input members, wherein the third gear of the first gear set, the third gear of the second gear set, the third gear of the third gear set, the second gear of the fourth gear set, the second gear of the fifth gear set and the third gear of the sixth gear set are each selectively connectable for common rotation with the first countershaft;

a second countershaft rotatably supported within the transmission housing and spaced apart from and parallel with the first and second transmission input members, wherein the second gear of the first gear set, the second gear of the second gear set, the second gear of the third gear set and the second gear of the sixth gear set are each selectively connectable for common rotation with the second countershaft;

a first synchronizer assembly selectively connects the second gear of the first gear set to the second countershaft;

a second synchronizer assembly selectively connects at least one of the second gear of the second gear set and second gear of the third gear set to the second countershaft;

a third synchronizer assembly selectively connects at least one of the third gear of the second gear set and the third gear of the third gear set to the first countershaft;

a fourth synchronizer assembly selectively connects at least one of the second gear of the fourth gear set and second gear of the fifth gear set to the first countershaft;

a fifth synchronizer assembly selectively connects the second gear of the sixth gear set to the second countershaft;

a sixth synchronizer assembly selectively connects the third gear of the sixth gear set to the first countershaft; and a first countershaft transfer gear fixed to the first countershaft for common rotation with the first countershaft;

a second countershaft transfer gear fixed to the second countershaft for common rotation with the second countershaft, and wherein the first and second countershaft transfer gears transfer torque from at least one of the first and second countershafts to a transmission output member, and wherein the selective engagement of the first and second clutches of the dual clutch assembly and the selective engagement of at least one of the synchronizer assemblies establishes at least one of eight forward speed ratios between the at least one of the first and the second transmission input members and the transmission output member.

* * * * *